United States Patent
Elmaliach et al.

(10) Patent No.: US 6,922,732 B2
(45) Date of Patent: Jul. 26, 2005

(54) CLASS-BASED PER-FLOW QUEUING ACROSS MULTIPLE HIERARCHICAL LINK-SHARING STRUCTURES

(75) Inventors: Yehuda Elmaliach, Hod HaSharon (IL); Asher Besserglick, Yahud (IL)

(73) Assignee: Mobixell Networks Inc., Wilmington, DE (US)

( * ) Notice: Subject to any disclaimer, the term of this patent is extended or adjusted under 35 U.S.C. 154(b) by 744 days.

(21) Appl. No.: 09/875,893

(22) Filed: Jun. 8, 2001

(65) Prior Publication Data

US 2002/0194372 A1 Dec. 19, 2002

(51) Int. Cl.[7] .............................................. G06F 15/173
(52) U.S. Cl. ...................... 709/240; 709/226; 709/234; 709/241; 707/10; 370/395.42; 370/392
(58) Field of Search ................................ 709/240, 226, 709/234, 241; 370/395.42, 392; 707/10

(56) References Cited

U.S. PATENT DOCUMENTS

| | | | |
|---|---|---|---|
| 5,889,956 A | * | 3/1999 | Hauser et al. ............... 709/226 |
| 5,991,812 A | | 11/1999 | Srinivasan |
| 6,046,980 A | | 4/2000 | Packer |
| 6,154,769 A | | 11/2000 | Cherkasova et al. |
| 6,519,595 B1 | * | 2/2003 | Rose ........................... 707/10 |
| 6,560,230 B1 | * | 5/2003 | Li et al. ................. 370/395.42 |
| 2002/0122422 A1 | * | 9/2002 | Kenney et al. ............. 370/392 |

OTHER PUBLICATIONS

Floys, et al., "Link Sharing and Resource Management Models for Packet Networks," IEEE/ACM Transactions on Networking, Aug. 1995, vol. 3 No. 4.

Goyal, et al., "Start–time Fair Queuing: A Scheduling Algorithm for Integrated Services Packet Switching Networks," Technical Report TR–96–02, Department of Computer Science, University of Texas at Austin, Jan. 1996.

* cited by examiner

Primary Examiner—Saleh Najjar
Assistant Examiner—Yves Dalencourt
(74) Attorney, Agent, or Firm—AlphaPatent Associates Ltd.; Daniel J. Swirsky

(57) ABSTRACT

A method for class-based per-flow queuing for use with multiple link-sharing hierarchies, where each one of multiple link-sharing hierarchies imposes a different resource allocation program at one or more levels of differentiation, extending from the link root node to each individual data flow. A new queuing decision layer is introduced that considers all hierarchies simultaneously and arrives at a single queuing solution.

12 Claims, 6 Drawing Sheets

CLASS-BASED PER-FLOW QUEUING ACROSS MULTIPLE HIERARCHICAL LINK-SHARING STRUCTURES

FIELD OF INVENTION

The present invention relates to computer and telecommunications networks in general, and more particularly to resource allocation therefor.

BACKGROUND OF THE INVENTION

In computer and telecommunications networks, devices such as routers and switches direct the flow of data packets between the data source and its destination. Where resources such as bandwidth of a particular router or switch is limited, known queuing techniques may be employed to prioritize the forwarding of data packets in accordance with discriminatory resource allocation criteria. In one such queuing technique, known as Class-based queuing (CBQ) and described in "Link Sharing and Resource Management Models for Packet Networks," Sally Floys and Van Jacobson, *IEEE/ACM Transactions on Networking*, Vol. 3 No. 4, August, 1995, a hierarchical link-sharing mechanism is provided for use in packet-based networks where multiple entities, such as agencies, protocol families, or traffic types, share a single data link in a controlled fashion. In CBQ, traffic flows that share a single data link are bundled into logical queues, where each queue represents a class of flows. Resource allocation of the shared resource (e.g., bandwidth) is then performed for each class based on a set of rules that establish the share that each queue is to receive of the shared resource.

An example of a prior art CBQ link-sharing hierarchy may be seen in FIG. 1, where three agencies are connected to a single link. Each agency in turn provides various network services, such as FTP and TELNET, shown as branched flows, which in turn may comprise branched flows representing lower-level services, data flow groupings, or individual data flows. In CBQ, each node of the hierarchy shown in FIG. 1 receives a percentage share in the shared resource, with the shares equaling 100% for all nodes at the same level. Scheduling mechanisms are then used to ensure that each node receives its allotted resource allocation.

While CBQ addresses resource allocation for a single link-sharing hierarchy, CBQ does not address the use of multiple link-sharing hierarchies where each hierarchy models resource allocation according to a different set of criteria. For example, in FIG. 1, while a TELNET user in Agency A ought to receive a portion of the 10% of the available link resources allotted to all TELNET users in Agency A, the introduction of an additional link-sharing hierarchy as shown in FIG. 2 and which has different classes of users might indicate, for example, that the user is a VIP user who ought to receive a portion of the 80% of the available link resources allotted to all VIP-users. Unfortunately, current CBQ techniques do not offer a way to consider multiple link-sharing hierarchies and arrive at a single queuing solution.

SUMMARY OF THE INVENTION

The present invention seeks to adapt CBQ for use with multiple link-sharing hierarchies. In the present invention each one of multiple link-sharing hierarchies imposes a different resource allocation program at one or more levels of differentiation, extending from the link root node to each individual data flow. A new queuing decision layer is introduced that considers all hierarchies simultaneously and arrives at a single queuing solution.

There is thus provided in accordance with a preferred embodiment of the present invention a method for class-based per-flow queuing across multiple hierarchical link-sharing structures, where each of the structures shares a single link, where each of the structures includes a plurality of leaves, where each of the leaves represents a single flow, and where each of the leaves is common to each of the structures, the method including a) providing a leaf selection mechanism operative to enforce a plurality of rules adapted for the multiple hierarchical link-sharing structures, and b) selecting in response to applying the leaf selection mechanism one of the leaves for servicing during a transmission opportunity.

Further in accordance with a preferred embodiment of the present invention the method further includes updating operating parameters of the multiple hierarchical link-sharing structures to reflect resource usage by the leaf serviced during the transmission opportunity.

There is also provided in accordance with a preferred embodiment of the present invention a method for class-based per-flow queuing across multiple hierarchical link-sharing structures, the method including a) distributing at least one of a plurality V of tokens to each of a plurality of hierarchical link-sharing structures, where each of the structures shares a single link, where each of the structures includes a plurality of leaves, where each of the leaves represents a single flow, and where each of the leaves is common to each of the structures, b) distributing each of the tokens to one of the leaves in each of the structures, and c) selecting one of the leaves having at least V tokens for servicing during a transmission opportunity.

Further in accordance with a preferred embodiment of the present invention the distributing step a) includes distributing a number of the tokens equal to the number of the structures.

Still further in accordance with a preferred embodiment of the present invention the distributing step a) includes distributing one of the tokens to each of the structures.

Additionally in accordance with a preferred embodiment of the present invention the distributing step a) includes distributing a first number of the tokens to a first one of the structures having a first weighting and a second number of the tokens to a second one of the structures having a second weighting, where the numbers are relatively proportional to the weightings.

Moreover in accordance with a preferred embodiment of the present invention the distributing step b) includes distributing to the leaf if the leaf has not exceeded its maximum allowable resource allocation for any of the structures.

Further in accordance with a preferred embodiment of the present invention the distributing step b) includes distributing to the leaf if a blocking period is not currently in effect for the leaf.

Still further in accordance with a preferred embodiment of the present invention the selecting step includes selecting where a queue associated with the leaf has data ready to be serviced via the link.

Additionally in accordance with a preferred embodiment of the present invention the selecting step includes selecting the leaf if the leaf has not exceeded its maximum allowable resource allocation for any of the structures.

Moreover in accordance with a preferred embodiment of the present invention the method further includes debiting the serviced leaf by V tokens.

Further in accordance with a preferred embodiment of the present invention the method further includes incrementing each of a plurality of usage counters at each node of the structures along the path from the serviced leaf to the link.

Still further in accordance with a preferred embodiment of the present invention the selecting step includes selecting the leaf from a group consisting of time-sensitive leaves.

Additionally in accordance with a preferred embodiment of the present invention the method further includes timestamping data upon arrival at each of a plural of queues, where each of the queues is associated with one of the leaves, and where the selecting step includes selecting the leaf having the longest-waiting of the data where none of the time-sensitive leaves has a greater number of tokens than any other of the time-sensitive leaves.

The disclosures of all patents, patent applications, and other publications mentioned in this specification and of the patents, patent applications, and other publications cited therein are hereby incorporated by reference.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1:
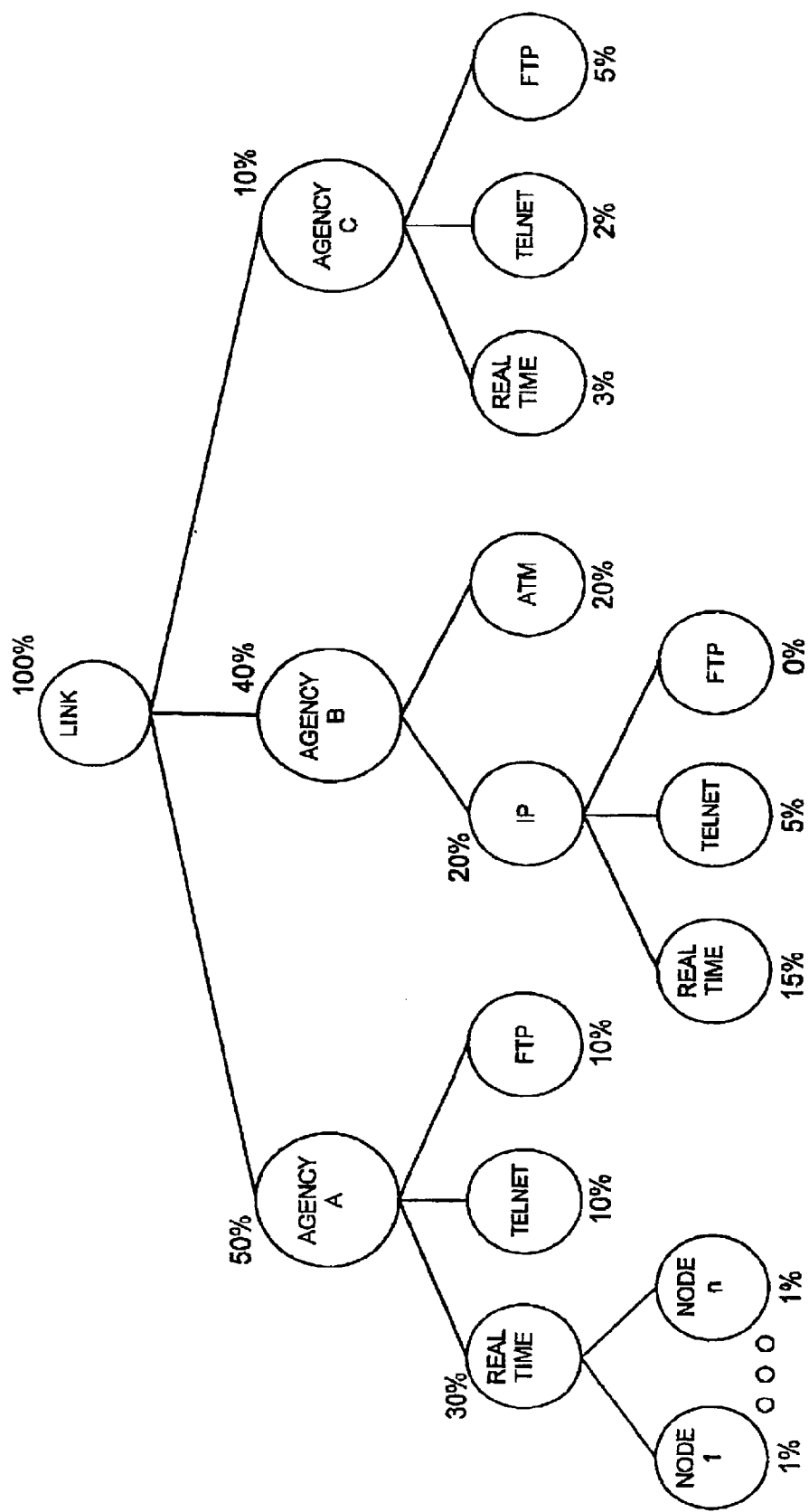
FIGS. 1 and 2 are simplified conceptual illustrations of exemplary prior art CBQ-based hierarchical link-sharing structures.
Figure 2:
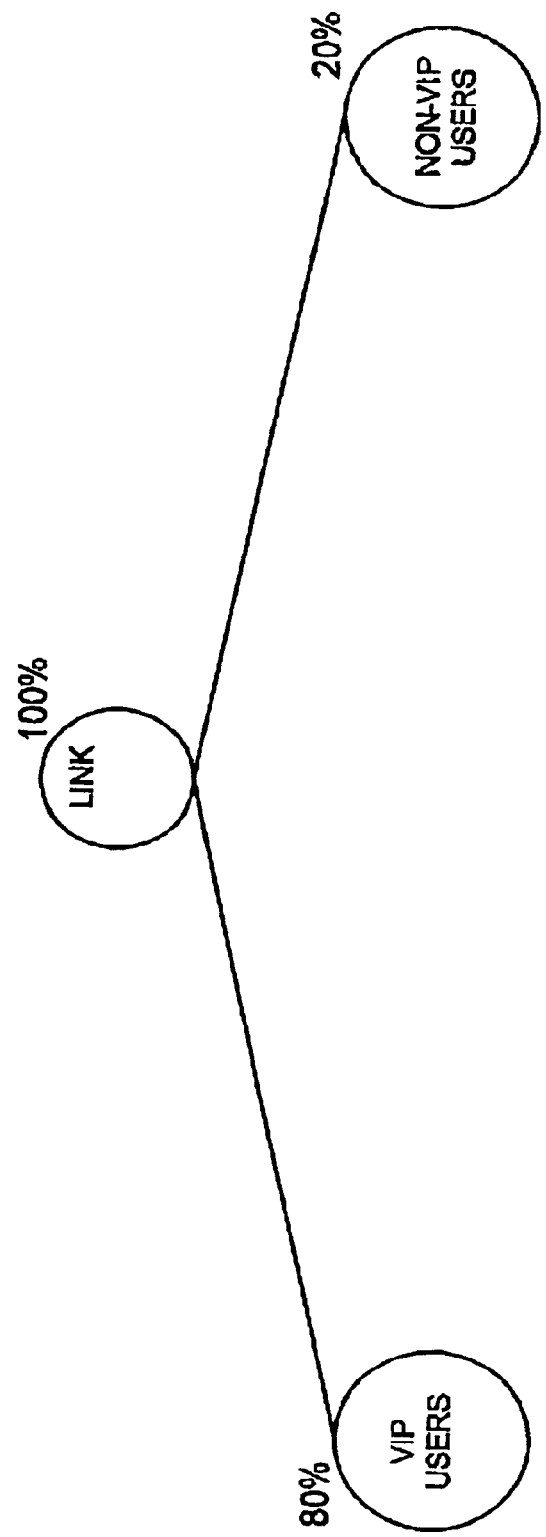
Figure 3:
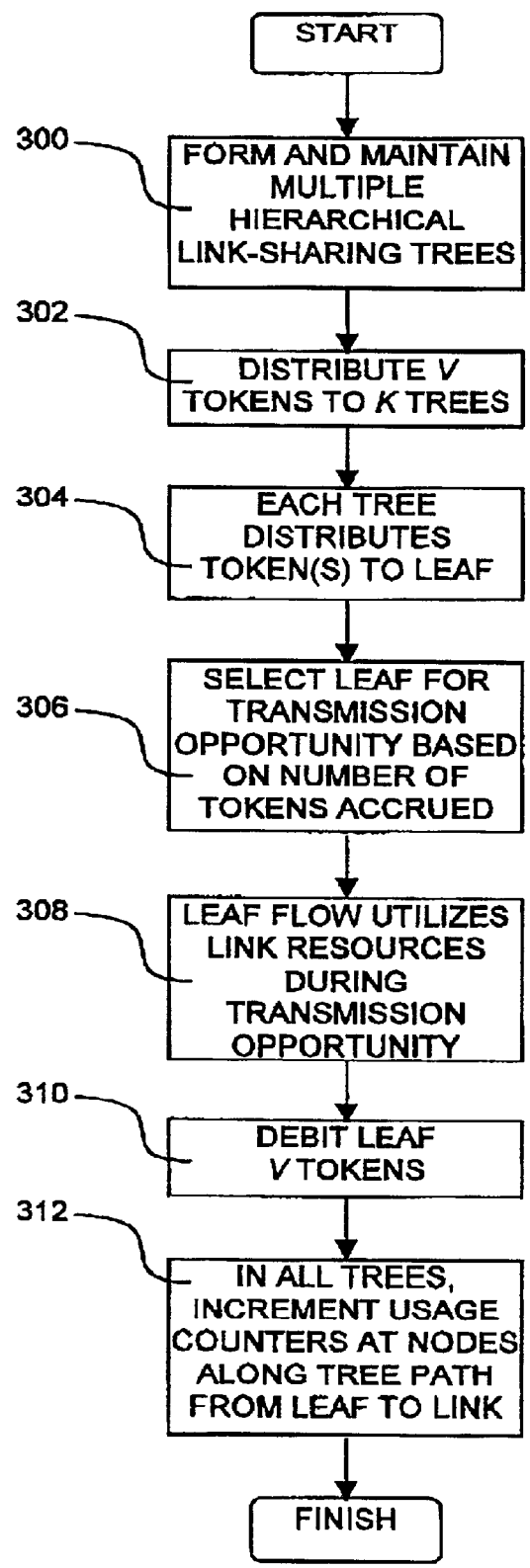
FIG. 3 is a simplified flowchart illustration of a method of class-based per-flow queuing across multiple hierarchical link-sharing structures, operative in accordance with a preferred embodiment of the present invention.
Figure 4:
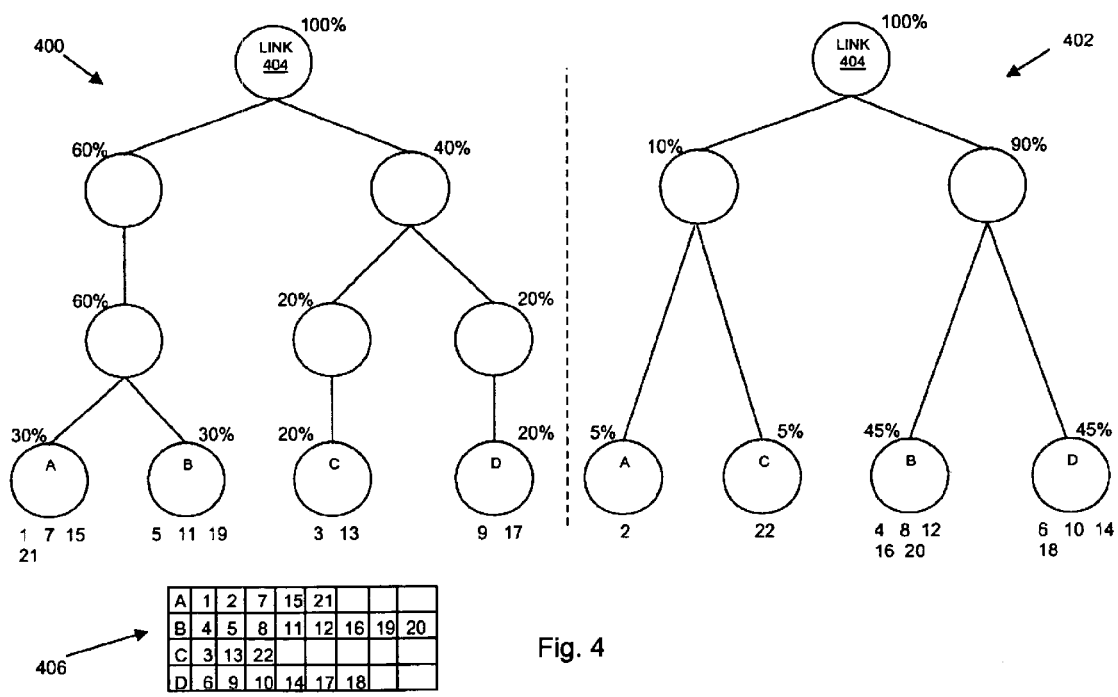
FIG. 4 is a simplified conceptual illustration of an exemplary implementation of class-based per-flow queuing across multiple hierarchical link-sharing structures, useful in understanding the method of FIG. 1.

Reference is now made to FIG. 3, which is a simplified flowchart illustration of a method of class-based per-flow queuing across multiple hierarchical link-sharing structures, operative in accordance with a preferred embodiment of the present invention, and additionally to FIG. 4, which is a simplified conceptual illustration of an exemplary implementation of class-based per-flow queuing across multiple hierarchical link-sharing structures, useful in understanding the method of FIG. 3. In the method of FIG. 3, a plurality K of hierarchical link-sharing structures or trees, such as trees 400 and 402 as shown in FIG. 4, are formed and maintained using known CBQ techniques (step 300). Although two trees are shown, any number of trees may be accommodated. As in FIGS. 1 and 2 above, trees 400 and 402 are configured such that each of their nodes receives a percentage share in the shared resource, with the shares equaling 100% for all nodes at the same level. Thus, for example, in tree 400 the two nodes below the link node are configured to receive 60% and 40% respectively of the link resources, such as 60% and 40% respectively of the link's available bandwidth. In accordance with the present invention, trees 400 and 402 share a single, common link 404, are configured such that all leaves represent single flows, labeled as A, B, C, and D, and have the same leaves (i.e., each single flow is expressed as a leaf in each tree). It is assumed that only one leaf nay use link 404 at any given time, with "use" of link 404 defined as receiving an allocation of the resources of link 404 for a period of time, such as receiving the fill bandwidth of link 404 for the transmission of a data packet in a Time Division Multiplexing (TDM) network. This link use by a leaf for a given period of time is herein referred to as a "transmission opportunity."

Prior to each transmission opportunity, a total of V tokens are distributed to the K trees, such that each tree receives one or more of the V tokens in accordance with its weighting relative to the other trees (step 302). Where all trees are equally weighted, V may be set equal to K such that each tree receives one token. Where the trees are not equally weighted, V may be set such that $$V = \sum_{i=1}^{K} w_i,$$

where each tree i is given $w_i$ ($w_i >= 0$) tokens where $w_i$ is the weight of the tree or a multiple thereof. Thus, where there are three trees weighted at 20%, 30%, and 50% respectively, the trees may receive 2, 3, and 5 tokens respectively for a total of V=10 tokens, or, alternatively, 20, 30, and 50 tokens respectively for a total of V=100 tokens. Whatever value is used for V, a leaf "earns" a transmission opportunity once it has accumulated at least V tokens.

In the exemplary implementation of FIG. 4, trees 400 and 402 are equally weighted, and, therefore, receive one token each for each transmission opportuniy. Each tree the distributes the token to one of its leaves in accordance with the tree's particular CBQ rules (step 304). Thus, for example, in FIG. 4, the token distribution for a first transmission opportunity results in token #1 being received by tree 400 and distributed to leaf A, and token #2 being received by tree 402 and likewise distributed to leaf A. For the next transmission opportunity, token #3 is received by tree 400 and distributed to leaf C, while token #4 is received by tree 402 and distributed to leaf B. For purposes of illustration, FIG. 4 shows 22 tokens representing 11 flow opportunities having been distributed to the leaves of trees 400 and 402. The token distribution for the leaves of both trees 400 and 402 is summarized in a table 406.

Once the tokens for a transmission opportunity have been distributed, a leaf may be selected to receive the resources of the link (step 306). In one preferred embodiment, the leaf with the greatest number of tokens, such as leaf B in FIG. 4, is selected, typically provided that the selected leaf may be serviced, e.g., if the leaf has a data packet queued and ready to be transmitted via the link and if the leaf has not exceeded its maximum allowable resource allocation in accordance with the CBQ rules that govern it. The selected leaf then utilizes its resource allocation (step 308).

The operating parameters of the multiple hierarchical link-sharing structures may be updated to reflect the link usage by the serviced leaf. The serviced leaf may be debited V tokens (step 310). Where usage counters are maintained for each node of the trees in accordance with known CBQ techniques, the usage counters along the path from the serviced leaf to the link may be incremented to record the resource usage (step 312).

In another preferred embodiment, a time-sensitive scheduler is used to select a leaf whose needs are time-sensitive.

The leaf that is both time-sensitive and that has the greatest number of tokens among other time-sensitive leaves is selected to have its queue serviced. Where no time-sensitive leaf has more tokens than any other time-sensitive leaf, the packet at the head of each leaf's queue may be checked, using conventional time-stamping and aging techniques, to determine which packet has been queued longer, and the leaf with the longest-waiting packet may be selected, such as in accordance with known start-time fair queuing techniques. Where no time-sensitive leaves needing service are found during a transmission opportunity, "greatest number of tokens," "longest-waiting packet," or any known combination of these criteria may be used to determine leaf selection.

The present invention may be implemented without modification for link-sharing flows across multiple CBQ-based link-sharing hierarchies where resource borrowing exists, such as from a direct ancestor, from a common ancient ancestor, etc. In order to support CBQ no-borrow mode, limitations may be set on the distribution of resources using a blocking mechanism in which a single hierarchy may limit the resources distributed to a flow by all other hierarchies.

Figure 5:
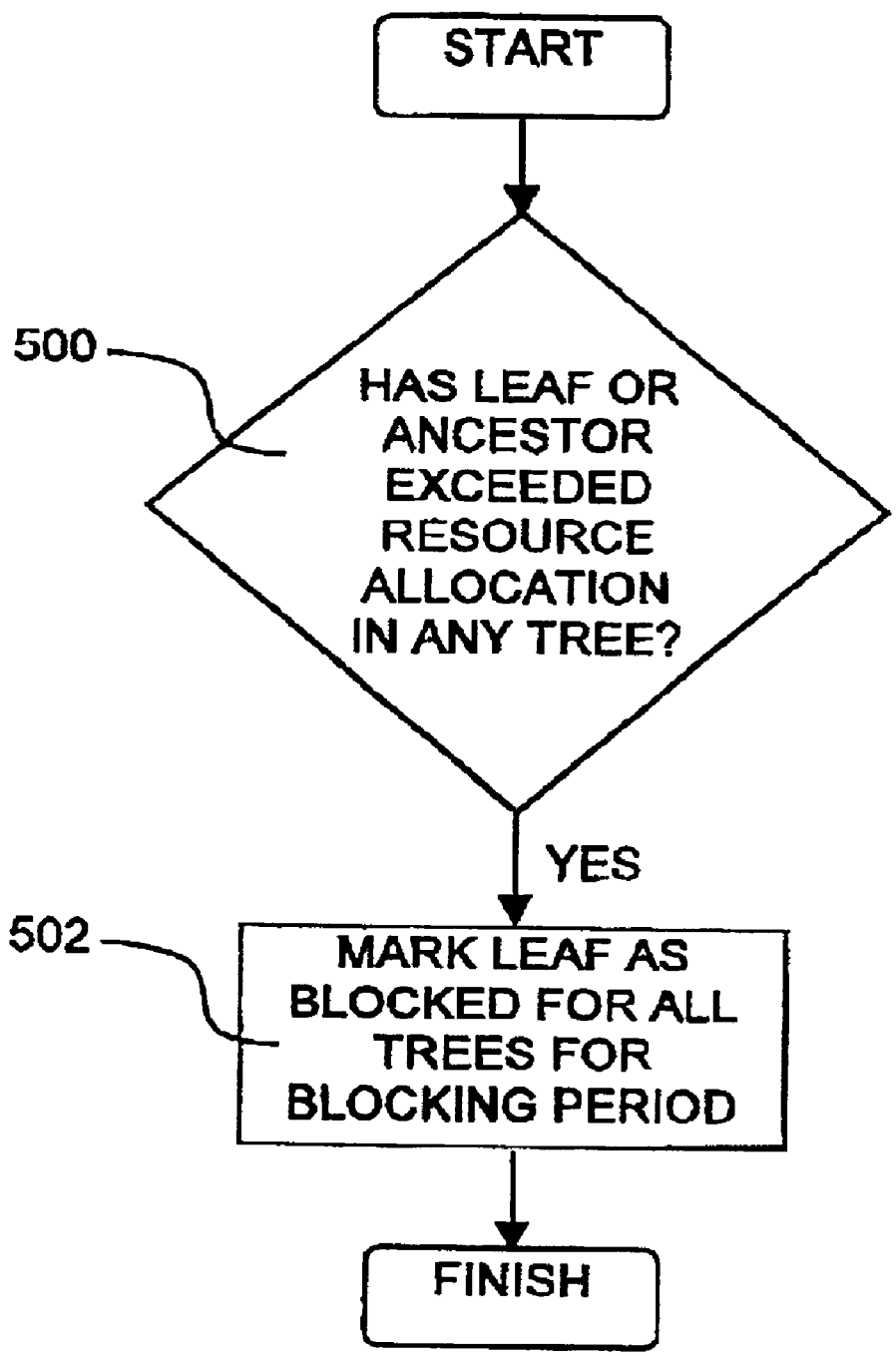
FIG. 5 is a simplified flowchart illustration of a method of blocking, operative in accordance with a preferred embodiment of the present invention.
Figure 6:
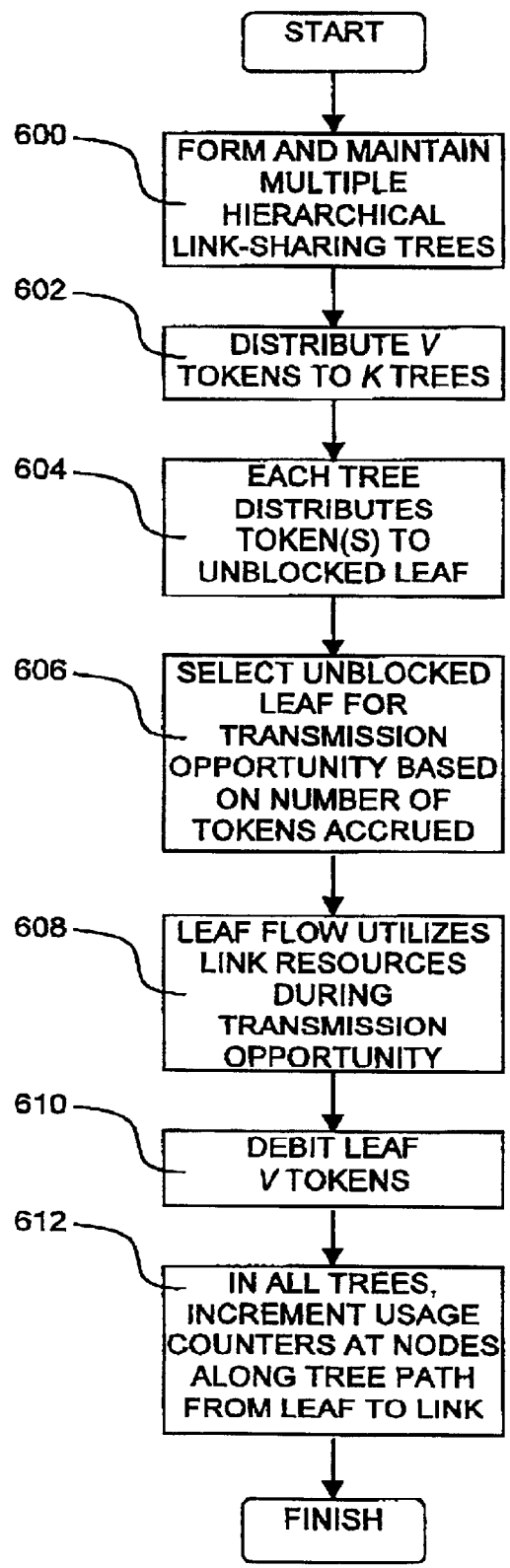
FIG. 6 is a simplified flowchart illustration of a method of class-based per-flow queuing across multiple hierarchical link-sharing structures, operative in accordance with a preferred embodiment of the present invention.

Reference is now made to FIG. 5 which is a simplified flowchart illustration of a method of blocking, operative in accordance with a preferred embodiment of the present invention, and additionally to FIG. 6, which is a simplified flowchart illustration of a method of class-based per-flow queuing across multiple hierarchical link-sharing structures, operative in accordance with a preferred embodiment of the present invention. Blocking may be implemented in any of the embodiments described above as follows. If at any time the particular rules of any tree in the multi-hierarchy model indicates that a leaf should not be serviced, such as where the leaf or any of its parent, grandparent, etc. nodes in a specific link-sharing hierarchy has exceeded its link resource allocation (step 500), then the leaf may be marked by the hierarchy as "blocked" (step 502). This causes the leaf to not be considered for a transmission opportunity, even if the leaf has accrued a sufficient number of tokens. Preferably, such a blocked leaf remains blocked for a predefined blocking period during which time tokens may not be allocated to the leaf by any of the link-sharing hierarchies in the multi-hierarchy model. Once the blocking period has expired, the leaf may again receive tokens and be considered for selection for a transmission opportunity, provided that the leaf may otherwise be serviced in accordance with all applicable rules at all trees. The method of FIG. 6 is substantial similar to the method of FIG. 3 with the notable exception that steps 604 and 606 are performed for unblocked leaves only.

It is appreciated that one or more steps of any of the methods described herein may be implemented in a different order than that shown while not departing from the spirit and scope of the invention.

While the present invention may or may not have been described with reference to specific hardware or software, the present invention has been described in a manner sufficient to enable persons having ordinary skill in the art to readily adapt commercially available hardware and software as may be needed to reduce any of the embodiments of the present invention to practice without undue experimentation and using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for class-based per-flow queuing across multiple hierarchical link-sharing structures, the method comprising:
   a) distributing at least one of a plurality V of tokens to each of a plurality of hierarchical link-sharing structures, wherein each of said structures shares a single link, wherein each of said structures comprises a plurality of leaves, wherein each of said leaves represents a single flow, and wherein each of said leaves is common to each of said structures;
   b) distributing each of said tokens to one of said leaves in each of said structures; and
   c) selecting one of said leaves having at least V tokens for servicing during a transmission opportunity.

2. A method according to claim 1 wherein said distributing step a) comprises distributing a number of said tokens equal to the number of said structures.

3. A method according to claim 2 wherein said distributing step a) comprises distributing one of said tokens to each of said structures.

4. A method according to claim 1 wherein said distributing step a) comprises distributing a first number of said tokens to a first one of said structures having a first weighting and a second number of said tokens to a second one of said structures having a second weighting, wherein said numbers are relatively proportional to said weightings.

5. A method according to claim 1 wherein said distributing step b) comprises distributing to said leaf if said leaf has not exceeded its maximum allowable resource allocation for any of said structures.

6. A method according to claim 1 wherein said distributing step b) comprises distributing to said leaf if a blocking period is not currently in effect for said leaf.

7. A method according to claim 1 wherein said selecting step comprises selecting where a queue associated with said leaf has data ready to be serviced via said link.

8. A method according to claim 1 wherein said selecting step comprises selecting said leaf if said leaf has not exceeded its maximum allowable resource allocation for any of said structures.

9. A method according to claim 2 and further comprising debiting said serviced leaf by V tokens.

10. A method according to claim 1 and further comprising incrementing each of a plurality of usage counters at each node of said structures along the path from said serviced leaf to said link.

11. A method according to claim 1 wherein said selecting step comprises selecting said leaf from a group consisting of time-sensitive leaves.

12. A method according to claim 11 and further comprising:
   time-stamping data upon arrival at each of a plurality of queues, where each of said queues is associated with one of said leaves; and
   wherein said selecting step comprises selecting said leaf having the longest-waiting of said data where none of said time-sensitive leaves has a greater number of tokens than any other of said time-sensitive leaves.

* * * * *